US012668423B2

(12) United States Patent
Zhu

(10) Patent No.: US 12,668,423 B2
(45) Date of Patent: Jun. 30, 2026

(54) THREE-DIMENSIONAL UNLOADING SYSTEM CAPABLE OF UNLOADING GOODS INTO CONTAINER AND CONTROL METHOD OF THREE-DIMENSIONAL UNLOADING SYSTEM

(71) Applicant: Zhejiang Libiao Robots Co., Ltd., Zhejiang (CN)

(72) Inventor: Jianqiang Zhu, Zhejiang (CN)

(73) Assignee: Zhejiang Libiao Robotics Co., Ltd., Hangzhou (CN)

( * ) Notice: Subject to any disclaimer, the term of this patent is extended or adjusted under 35 U.S.C. 154(b) by 511 days.

(21) Appl. No.: 18/037,446

(22) PCT Filed: Jul. 8, 2021

(86) PCT No.: PCT/CN2021/105225
§ 371 (c)(1),
(2) Date: May 17, 2023

(87) PCT Pub. No.: WO2022/151678
PCT Pub. Date: Jul. 21, 2022

(65) Prior Publication Data
US 2023/0406627 A1 Dec. 21, 2023

(30) Foreign Application Priority Data
Jan. 12, 2021 (CN) .......................... 202110034970.3

(51) Int. Cl.
*B65G 1/04* (2006.01)
*B07C 3/08* (2006.01)
(Continued)

(52) U.S. Cl.
CPC ............ *B65G 1/0492* (2013.01); *B07C 3/082* (2013.01); *B07C 5/36* (2013.01); *B65G 1/065* (2013.01);
(Continued)

(58) Field of Classification Search
CPC ................ B65G 1/0492; B65G 1/1378; B65G 2201/0285; B65G 47/50; B65G 47/962;
(Continued)

(56) References Cited

U.S. PATENT DOCUMENTS 8,425,173 B2 4/2013 Lert et al.
8,594,835 B2 11/2013 Lert et al.
(Continued)

FOREIGN PATENT DOCUMENTS

CN 201472965 U 5/2010
CN 104550543 A 4/2015
(Continued)

OTHER PUBLICATIONS

Written Opinion of The International Searching Authority of WO2022151678, dated Oct. 8, 2021.
(Continued)

*Primary Examiner* — Thomas Randazzo
(74) *Attorney, Agent, or Firm* — Warner Norcross + Judd LLP

(57) ABSTRACT

Provided are a three-dimensional unloading system capable of unloading goods into a container and a control method of the three-dimensional unloading system. The system comprises: soring platforms; self-navigation carts; parcel identification devices; and positioning devices. The three-dimensional unloading system further comprises more than one shelf, the shelf consisting of a plurality of containers, each container being capable of storing good, and the shelf being mounted at a position close to an unloading outlet; a conveying device, on which a conveying frame is fixed; an unloading device, fixed on the conveying frame, the unloading device being capable of moving to the unloading outlet under the driving of the conveying device so as to receive the goods unloaded from the self-navigation cart, then (Continued)

moving to close to a predetermined container, and unloading the goods in the container; and a server, being wirelessly connected to a controller of the self-navigation cart.

20 Claims, 3 Drawing Sheets

(51) Int. Cl.

| | |
|---|---|
| *B07C 5/36* | (2006.01) |
| *B65G 1/06* | (2006.01) |
| *B65G 1/137* | (2006.01) |
| *B65G 47/50* | (2006.01) |
| *B65G 47/90* | (2006.01) |
| *B65G 47/96* | (2006.01) |
| *G06Q 10/08* | (2024.01) |

(52) U.S. Cl.

CPC .......... *B65G 1/1378* (2013.01); *B65G 47/50* (2013.01); *B65G 47/962* (2013.01); *G06Q 10/08* (2013.01); *B07C 2501/0063* (2013.01); *B65G 2201/0285* (2013.01); *B65G 2203/0216* (2013.01)

(58) Field of Classification Search

CPC .......... B65G 2203/0216; B65G 1/1373; B07C 3/082; B07C 2501/0063; B07C 5/36; G06Q 10/08

See application file for complete search history.

(56) References Cited

U.S. PATENT DOCUMENTS

| | | | |
|---|---|---|---|
| 8,740,538 B2 | 6/2014 | Lert et al. | |
| 9,051,120 B2 | 6/2015 | Lert et al. | |
| 9,096,375 B2 | 8/2015 | Lert et al. | |
| 9,694,975 B2 | 7/2017 | Lert et al. | |
| 9,725,239 B2 | 8/2017 | Lert et al. | |
| 9,771,217 B2 | 9/2017 | Lert et al. | |
| 10,035,649 B2 | 7/2018 | Lert et al. | |
| 10,239,691 B2 | 3/2019 | Lert et al. | |
| 10,442,622 B2 | 10/2019 | Lert et al. | |
| 10,556,743 B2 | 2/2020 | Sullivan et al. | |
| 10,577,180 B1 | 3/2020 | Mehta et al. | |
| 10,717,599 B2 | 7/2020 | Lert et al. | |
| 11,124,361 B2 | 9/2021 | Lert et al. | |
| 11,254,501 B2 | 2/2022 | Sullivan et al. | |
| 11,254,506 B1 * | 2/2022 | Robin | B07C 3/18 |
| 11,608,228 B2 | 3/2023 | Lert et al. | |
| 11,623,826 B2 * | 4/2023 | Fosnight | B65G 1/0492 700/214 |
| 11,759,826 B1 * | 9/2023 | Baring | B07C 3/008 414/807 |
| 2018/0117634 A1 * | 5/2018 | Xu | B65G 1/137 |
| 2019/0337723 A1 | 11/2019 | Wagner et al. | |
| 2023/0002158 A1 * | 1/2023 | Hansl | B65G 1/0485 |

FOREIGN PATENT DOCUMENTS

| | | | | |
|---|---|---|---|---|
| CN | 105292892 A | 2/2016 | | |
| CN | 106743011 A | 5/2017 | | |
| CN | 108438699 A | * 8/2018 | .............. | B65G 1/04 |
| CN | 108584268 A | 9/2018 | | |
| CN | 109051491 A | 12/2018 | | |
| CN | 109573443 A | 4/2019 | | |
| CN | 209366209 U | 9/2019 | | |
| CN | 209455449 U | 10/2019 | | |
| CN | 209684566 U | 11/2019 | | |
| CN | 210526999 U | 5/2020 | | |
| CN | 210762508 U | 6/2020 | | |
| CN | 210794858 U | 6/2020 | | |
| CN | 111422542 A | 7/2020 | | |
| CN | 111470242 A | 7/2020 | | |
| CN | 211003001 U | 7/2020 | | |
| CN | 211679724 U | 10/2020 | | |
| CN | 212291942 U | 1/2021 | | |
| CN | 112811055 A | 5/2021 | | |
| EP | 1995192 A2 | 11/2008 | | |
| EP | 3613681 A1 | 2/2020 | | |
| JP | H09278117 A | 10/1997 | | |
| JP | 4078936 B2 | 4/2008 | | |
| JP | 201367440 A | 4/2013 | | |
| TW | 200914340 A | 4/2009 | | |
| TW | 201102331 A | 1/2011 | | |
| TW | 2020028081 A | 8/2020 | | |
| WO | 2019206024 A1 | 10/2019 | | |

OTHER PUBLICATIONS

International Search Report of WO2022151678, dated Sep. 13, 2021.

Notification to Grant Patent Right for Invention of Priority Application CN202110034970.3.

First Search of Priority Application CN202110034970.3.

First Office Action of Priority Application of CN202110034970.3.

First Office Action of Application No. CN202110034970.3.

Decision to Grant a Patent with Application No. CN202110034970.3.

European Patent Office Supplemental Search Report for Application No. 21 918 874.5 mailed Mar. 19, 2024, pp. 1-4.

European Patent Office Communication pursuant to Article 94(3) for Application No. 21 918 874.5 mailed Apr. 2, 2024, pp. 1-7.

Japanese Patent Office Decision to Grant a Patent (English translation) for Application No. 2023-526464 mailed Dec. 20, 2024, pp. 1-2.

Japanese Patent Office Notice of Reasons for Refusal (English translation) for Application No. 2023-526464 mailed Jun. 24, 2024, pp. 1-4.

Korean Patent Office Request for the Submission of an Opinion (English translation) for Application No. 10-2023-7017505 mailed Apr. 14, 2025, pp. 1-12.

Korean Patent Office Notice of Final Rejection (English translation) for Application No. 10-2023-7017505 mailed Dec. 1, 2025, pp. 1-5.

Korean Patent Office Notice of Fact Regarding Third-Party Information Submission (English translation) for Application No. 10-2023-7017505 mailed Mar. 20, 2025, pp. 1-2.

* cited by examiner

THREE-DIMENSIONAL UNLOADING SYSTEM CAPABLE OF UNLOADING GOODS INTO CONTAINER AND CONTROL METHOD OF THREE-DIMENSIONAL UNLOADING SYSTEM

CROSS-REFERENCE TO RELEVANT APPLICATIONS

The present disclosure claims the priority of the Chinese patent application filed with the China National Intellectual Property Administration on Jan. 12, 2021 with the application number of 2021100349703, entitled "THREE-DIMENSIONAL UNLOADING SYSTEM CAPABLE OF UNLOADING GOODS INTO CONTAINER AND CONTROL METHOD OF THREE-DIMENSIONAL UNLOADING SYSTEM", which is incorporated herein in its entirety by reference.

TECHNICAL FIELD

The present disclosure relates to a robot unloading system and a control method thereof.

BACKGROUND ART

Sorting and unloading goods by self-navigation carts which are robots has been widely used. In the prior art, goods are usually required to be unloaded at a predetermined outlet, for example, parcels are unloaded at different outlets based on regional distribution, and then are packaged at the same outlet for transportation. There is a demand for unloading goods in a predetermined container on a shelf, and due to a shelf may be provided with a plurality of containers, all goods can be conveniently transported to the packaging place as long as the shelf is transported to the packaging place. Therefore, how to unload the goods sorted by the robots into a predetermined container on a shelf is the problem that is required to be solved by the present disclosure.

SUMMARY

The present disclosure provides a three-dimensional unloading system capable of unloading goods into a container and a control method thereof according to the demands above.

The present disclosure provides a three-dimensional unloading system capable of unloading goods in a container, including:
- a sorting platform, which is provided with a loading inlet and an unloading outlet;
- a plurality of self-navigation carts, which are capable of traveling on the sorting platforms and unloading, at the unloading outlet, goods carried by themselves;
- a parcel identification device, which is installed at the loading inlet of the sorting platform, and is capable of identifying the goods placed on the self-navigation carts;
- a positioning device, which is configured to perform positioning when the self-navigation carts are traveling;
wherein the three-dimensional unloading system further includes:
more than one shelve, each of the shelves is composed of a plurality of containers, wherein each of the containers is capable of storing the goods, and the shelves are installed at a position close to the unloading outlet;
a conveying device, which is fixed with a conveying frame;
an unloading device, which is fixed on the conveying frame, wherein the unloading device is capable of moving to the unloading outlet under driving of the conveying device to carry the goods that are unloaded from the self-navigation carts, then moving to a position close to a predetermined container, and loading the goods into the container; and
a server, which is connected to controllers of the self-navigation carts in a wireless manner, and is connected to the parcel identification device, a controller of the conveying device, and a controller of the unloading device, in a wire or wireless manner.
Optionally, the unloading device includes:
a first unloading driving wheel and a second unloading driving wheel, wherein shaft cores thereof are rotationally connected to the conveying frame, respectively;
a conveying belt, which is connected to the first unloading driving wheel and second unloading driving wheel, wherein the conveying belt is configured to carry the goods; and
an unloading motor, wherein a housing of the unloading motor is fixed to the conveying frame, and a rotating shaft of the unloading motor is fixed to the shaft core of the first unloading driving wheel or the shaft core of the second unloading driving wheel, wherein the unloading motor is electrically connected to the controller of the unloading device, and the unloading motor, when rotating, is capable of unloading the goods.
Optionally, the unloading device includes:
a first decelerator;
a rotation motor, wherein a housing of the rotation motor is fixed to a housing of the first decelerator, a rotating shaft of the rotation motor is fixed to an input shaft of the first decelerator, and the rotation motor is electrically connected to the controller of the unloading device;
a rotation bracket, which is fixed to an output shaft of the first decelerator;
a rotation plate, which is fixed to the rotation bracket, and the rotation plate is configured to hold the goods;
a second decelerator, wherein a housing of the second decelerator is fixed to the conveying frame;
a swing motor, wherein a housing of the swing motor is fixed to the housing of the second decelerator, a rotating shaft of the swing motor is fixed to an input shaft of the second decelerator, and the swing motor is electrically connected to the controller of the unloading device;
a swing lever, wherein an end of the swing lever is fixed to an output shaft of the second decelerator, and another end of the swing lever is fixed to the housing of the first decelerator; and
a rotation of the swing motor is capable of driving the rotation plate to swing it to a position above the predetermined container, and a rotation of the rotation motor is capable of unloading the goods into the container.
Optionally, the conveying device includes:
a vertical moving device, which is provided with:
a hollow lever, which is vertically fixed relative to the ground, wherein the hollow lever is provided with an open end, and two outer sides of the hollow lever are provided with grooves;

a first synchronous belt wheel and a second synchronous belt wheel, which are rotatably fixed inside the hollow lever at two ends, respectively;

a synchronous belt, which is connected to the first synchronous belt wheel and the second synchronous belt wheel;

an actuating motor, wherein a housing of the actuating motor is fixed to the hollow lever, a rotating shaft of the actuating motor is fixed to a central shaft of the first synchronous belt wheel or a central shaft of the second synchronous belt wheel, and the actuating motor is electrically connected to the controller of the conveying device; and a sliding block, which is provided with a convex block and two sliding rails, wherein the convex block is capable of being embedded into the open end of the hollow lever and fixed to the synchronous belt, wherein the sliding rails are only capable of moving back and forth along the grooves, and the sliding block is fixed to the conveying frame.

Optionally, the conveying device further includes:

a lateral moving device, wherein a structure of the lateral moving device is the same as that of the vertical moving device, and the hollow lever of the lateral moving device is fixed horizontally to the ground through a bracket, the hollow lever of the vertical moving device is fixed to the sliding block in the lateral moving device, and the actuating motor of the lateral moving device is electrically connected to the controller of the conveying device.

When the self-navigation carts unload the goods, the unloading device moves to a position close to the goods, wherein when the goods just touch the unloading device, the unloading device moves slowly downward, until the goods completely slide onto the unloading device.

Optionally, the sorting platform is provided as being of a plurality of layers, each layer of the sorting platform is provided with the self-navigation carts to transport and unload goods, and each layer of the sorting platform is provided with the parcel identification device and the positioning device.

Optionally, the shelves are movable shelves.

Each layer in the shelves is provided with two parallel crosspieces, each of the containers is provided with two corresponding flanges, and the two flanges of each of the containers are pressed on the two crosspieces.

Optionally, the containers of the shelves are arranged in a matrix.

Optionally, the positioning device includes:

a plurality of location landmarks, which are installed on the sorting platform and can be identified by sensors of the self-navigation carts, wherein the location landmarks include QR codes, color block marks, figure size marks, or figure quantity marks, and the corresponding sensors are cameras.

The present disclosure further provides a control method for a three-dimensional unloading system capable of unloading goods into containers, including the following steps:

S1, a conveying device moves an unloading device to goods on self-navigation carts located at the unloading outlet, and the self-navigation carts start to unload the goods;

S2, the unloading device descends slowly when the goods touch the unloading device, until the goods completely slide onto the unloading device; and S3, the conveying device is restored to a normal velocity, and conveys the unloading device to a position close to a predetermined container to unload.

The advantages of the present disclosure are: goods can be directly unloaded into a predetermined container on a shelf after sorting; the containers on the shelves are closely arranged, which, compared with the prior art, greatly increases the delivery density, improves the utilization of space, and also improves the unloading speed; and when the self-navigation carts unload goods, the unloading device carries the goods slowly, which can effectively reduce the impact force on the goods, and reduce the damage to goods by collision.

The present disclosure has the beneficial effects of a compact structure, a high space utilization rate, a fast unloading speed, and a reduced damage to the goods.

DETAILED DESCRIPTION OF EMBODIMENTS

Figure 1:
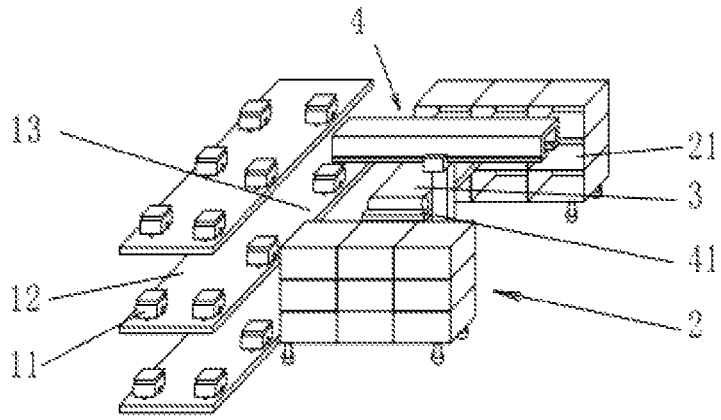
FIG. 1 is an overall structural diagram of the present disclosure.

Now the present disclosure is further explained in conjunction with the accompanying drawings:

As shown in FIG. 1, a three-dimensional unloading system capable of unloading goods into a container may include:

a sorting platform 12, which may be provided with a loading inlet and an unloading outlet 13;

a plurality of self-navigation carts 11, which are capable of traveling on the sorting platform 12 and are capable of unloading, at the unloading outlet 13, goods 5 carried by themselves;

a parcel identification device, which may be installed at the loading inlet of the sorting platform 12, and is capable of identifying the goods 5 installed on the self-navigation carts 11 artificially or by a robot;

a positioning device, which is configured to perform positioning when a plurality of the self-navigation carts are traveling;

a conveying device 4, which is fixed with a conveying frame;

more than one shelve 2, wherein each of the shelves 2 may be composed of a plurality of containers 21, each of the containers 21 is capable of storing the goods 5, the shelves 2 may be installed at a position close to the unloading outlet 13; in order to improve the space utilization rate and unloading efficiency, each of the shelves 2 may be provided with a plurality of containers 21 vertically, wherein a plurality of the containers 21 may be arranged in a matrix, preferably, two shelves 2 may be provided, and the two shelves 2 are located on both sides of the conveying device 4, respectively, so as to reduce the distance for loading goods; the shelves 2 may preferably be movable shelves, and the containers 21 on the shelves 2 may preferably be of a detachable structure, that is, the containers 21 may move separately;

an unloading device 3, which can be fixed on the conveying frame, wherein the unloading device 3 is capable of moving to the unloading outlet 13 under the driving of the conveying device 4 to carry the goods 5 that are unloaded from the self-navigation carts, then moving to the predetermined container 21 and loading the goods 5 into the container 21; and a sever, which may be connected to controllers of the self-navigation carts 2 in a wireless manner and connected to the parcel identification device, a controller of the conveying device 4, and a controller of the unloading device 3, in a wire or wireless manner.

Compared with the prior art, the advantages of the present disclosure are: after the goods 5 are unloaded into the containers 21 on the shelves 2, the shelves 2 are capable of being moved to the packaging place to package, so as to meet some specific requirements. At the same time, the containers 21 on the shelves 2 may be arranged closely, which, compared with the prior art, greatly increases the outlet density, improves the utilization of space, and also improves the unloading speed.

It should also be noted that each of the containers 21 has a number, and each of the containers 21 may be installed with more than one goods 5 corresponding to a particular owner or region, etc., for example, two commodities ordered by a buyer; a batch of goods ordered by a buyer in a certain province or city, etc.

Figure 4:
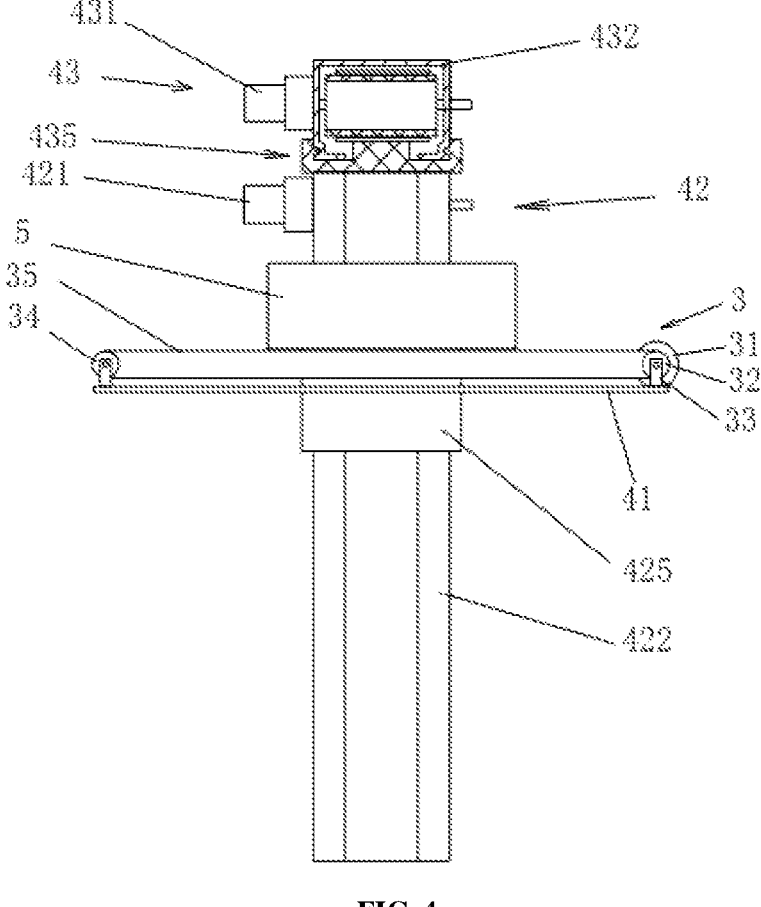
FIG. 4 is a structural diagram of a conveying device and the unloading device of the present disclosure.

Optionally, in an embodiment, as shown in FIG. 1 and FIG. 4, the unloading device 3 may include:

a first unloading driving wheel 32 and a second unloading driving wheel 34, wherein shaft cores of the first unloading driving wheel 32 and the second unloading driving wheel 34 are may be rotationally connected to the conveying frame respectively; in the present embodiment, the conveying frame may be a horizontal board 41, both sides thereof may be provided with folds 33 which are bent to 90 degrees, and the folds 33 are capable of being configured to install the shaft cores of the first unloading driving wheel 32 and the second unloading driving wheel 34;

a conveying belt 35, which may be connected to the first unloading driving wheel 32 and the second unloading driving wheel 34, and the conveying belt 35 is capable of being configured to carry the goods 5; and an unloading motor 31, wherein a housing of the unloading motor 31 may be fixed with the folds 33, a rotating shaft of the unloading motor 31 may be fixed to the shaft core of the first unloading driving wheel 32 or the shaft core of the second unloading driving wheel 34, the unloading motor 31 may be electrically connected to the controller of the unloading device 3, and the unloading motor 31, when rotating, is capable of unloading the goods 5.

In general, the unloading motor 31 can be selected as a gear motor, a plurality of carrier wheels may also be added, and the carrier wheels may be configured for supporting the middle part of the conveying belt 35 to increase the carrying weight for the goods 5.

In the present embodiment, when unloading the goods, the goods 5 are capable of being unloaded in the shelves 2 on the left or right side by forward or reverse rotation of the unloading motor 31.

Figure 6:
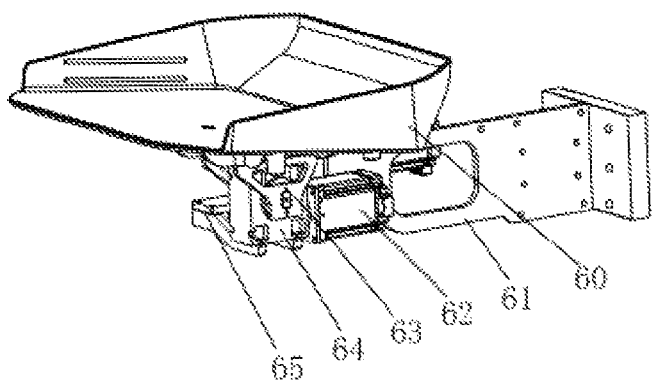
FIG. 6, FIG. 7, and FIG. 8 are schematic diagrams of related structures of the unloading device that adopts a rotation plate.
Figure 7:
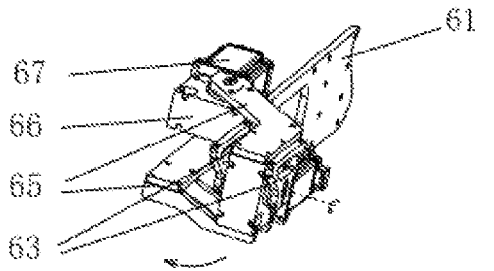
Figure 8:
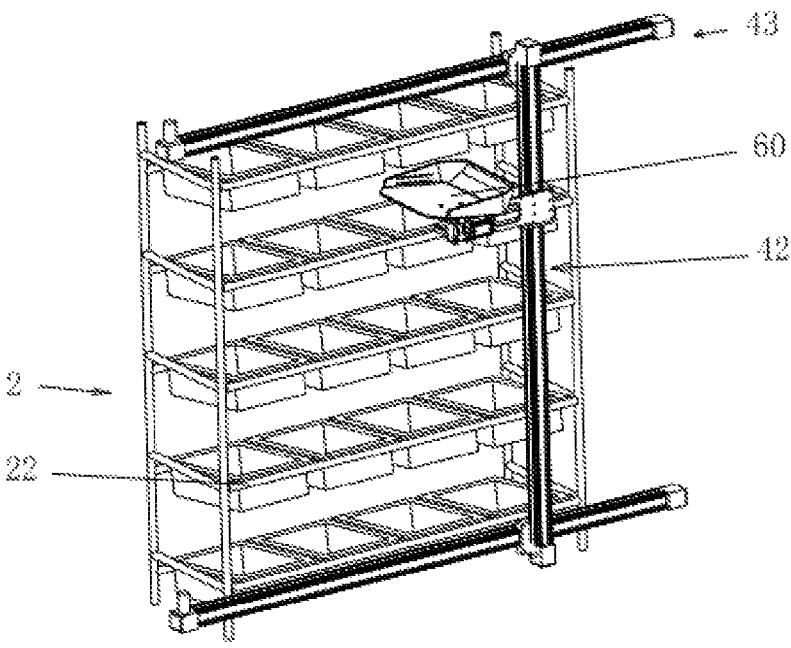

Optionally, in an embodiment, as shown in FIG. 6, FIG. 7 and FIG. 8, the unloading device 3 may include:

a first decelerator 64;

a rotation motor 62, wherein a housing of the rotation motor 62 may be fixed to a housing of the first decelerator 64, a rotating shaft of the rotation motor 62 may be fixed to an input shaft of the first decelerator 64, and the rotation motor 62 may be electrically connected to the controller of the unloading device 3;

two symmetrical rotation brackets 63 may be provided, and they may be fixed to the output shaft of the first decelerator 64;

a rotation plate 60, which may be fixed to the rotation bracket 63, and the rotation plate 60 is capable of being configured to hold the goods 5;

a second decelerator 66, wherein a housing of the second decelerator 66 may be fixed to the conveying frame; and in the present embodiment, the conveying frame may be a vertical board 61;

a swing motor 67, wherein a housing of the swing motor 67 may be fixed to the housing of the second decelerator 66, the rotating shaft of the swing motor 67 may be fixed to the input shaft of the second decelerator 66, and the swing motor 67 may be electrically connected to the controller of the unloading device 3;

a swing lever 65, wherein one end of the swing lever 65 may be fixed to the output shaft of the second decelerator 66, and another end may be fixed to the housing of the first decelerator 64, and two swing levers 65 may be provided in order to increase the strength; and the rotation of the swing motor 67 is capable of driving the rotation plate 60 to swing it to a positon above the predetermined container 21, and the rotation of the rotation motor 62 is capable of unloading the goods 5 into the container 21.

In the present embodiment, the shelves 2 may be only configured for one side.

Figure 5:
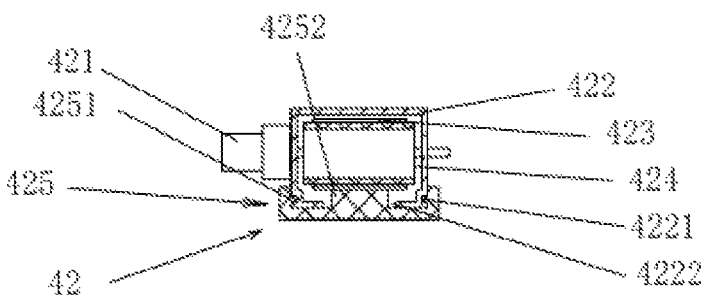
FIG. 5 is a top view of the vertical moving device of the present disclosure.

Optionally, in an embodiment, as shown in FIG. 4 and FIG. 5, the conveying device 4 may include:

a vertical moving device 42, which may be provided with:

a hollow lever 422, which may be vertically fixed relative to the ground, wherein the hollow lever 422 is provided with an open end 4222, two outer sides of the hollow lever 422 are provided with grooves 4221, and the hollow lever 422 in the present embodiment may be directly fixed on the ground;

a first synchronous belt wheel 424 and a second synchronous belt wheel, which may be rotatably fixed inside the hollow lever 422 at two ends, respectively;

a synchronous belt 423, which may be connected to the first synchronous belt wheel 424 and the second synchronous belt wheel;

an actuating motor 421, wherein a housing of the actuating motor 421 may be fixed to the hollow lever 422, a rotating shaft of the actuating motor may be fixed to a central shaft of the first synchronous belt wheel 424 or a central shaft of the second synchronous belt wheel, the actuating motor 421 may be electrically connected to the controller of the conveying device 4, and the actuating motor 421 may be selected as an actuating motor provided with a decelerating mechanism; and a sliding block 425, which may be provided with a convex block 4252 and two sliding rails 4251, the convex block 4252 is capable of being embedded into the open end 4222 of the hollow lever 422 and fixed to the synchronous belt 423, the sliding rails 4251 can only move back and forth along the grooves 4221, and the sliding block 425 may be fixed to the conveying frame.

The conveying device 4 that is only provided with the vertical moving device 42 may only unload the goods 5 into the containers 21 in the same column at different heights. Optionally, in order to cover a plurality of columns of the containers 21, in a basis of vertical moving device 42, as shown in FIG. 4, the conveying device 4 may further include:

a lateral moving device 43, wherein the structure of the lateral moving device 43 may be the same as that of the vertical moving device 42, and a hollow lever 432 of the lateral moving device 43 is fixed horizontally to the ground through a bracket, the hollow lever 422 of the vertical moving device 42 is fixed to the sliding block 435 in the lateral moving device 43, and the actuating motor 431 in the lateral moving device 43 may be electrically connected to the controller of the conveying device 4.

The structures of the lateral moving device 43 and the vertical moving device 42 are the same, which may reduce the cost, facilitate the management, and meanwhile realize the three-dimensional unloading.

Optionally, as shown in FIG. 8, two lateral moving devices 42 may be provided, one vertical moving device 42 may be provided, the upper part and the lower part of the vertical moving device 42 may be fixed to the sliding blocks 435 in the two lateral moving devices 43, respectively, and the stability performance of the structure is better.

Figure 2:
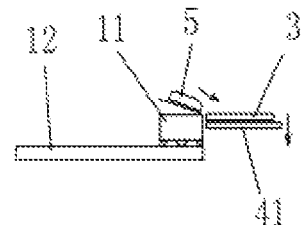
FIG. 2 is a structural diagram of the present disclosure in which the unloading device moves to a position close to goods when unloading the goods.
Figure 3:
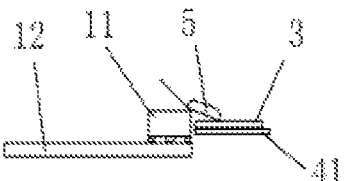
FIG. 3 is a structural diagram of the present disclosure in which the unloading device descends slowly when the goods just touch the unloading device.

Optionally, as shown in FIG. 2 and FIG. 3, when the self-navigation carts 11 on the sorting platform 12 unload the goods 5, the unloading device 3 may move to a position close to the goods 5, wherein when the goods 5 just touch the unloading device 3, the unloading device 3 may descend slowly, until the goods 5 completely slide onto the unloading device 3. According to the forementioned embodiments, the unloading device 3 may include the conveying belt 35 or the rotation plate 60.

It should be noted that, in the prior art, when the self-navigation carts 11 unload the goods, the goods 5 are usually unloaded directly at the outlet, and there is a certain height between the outlet and the self-navigation carts 11. Therefore, if the goods 5 are fragile products, they may be damaged by the impact force. The unloading method of the present disclosure may effectively reduce the impact force on the goods 5 and reduce the damages to the goods.

In order to improve the space utilization, the sorting platform 12 is provided as being of a plurality of layers, each layer of the sorting platform 12 is provided with the self-navigation carts 11 to transport and unload goods, and each layer of the sorting platform 12 is configured with the parcel identification device and the positioning device.

The shelves 2 of the present disclosure may be movable shelves, which are capable of being moved by a human or a robot.

Optionally, for the convenience of picking up goods, each layer in the shelves 2 is provided with two parallel crosspieces 22, each of the containers 21 is provided with two corresponding flanges, and the two flanges of each of the containers 21 can be pressed on the two crosspieces 22.

The positioning device, for example, may include:

a plurality of location landmarks, which may be installed on the sorting platform 12 and capable of being identified by sensors on the self-navigation carts 11, the location landmarks include QR codes, color block marks, figure size marks, or figure quantity marks, and the corresponding sensors may be cameras, and this part is the prior art.

The present disclosure further provides a control method for a three-dimensional unloading system capable of unloading goods into containers, including the following steps:

S1, a conveying device 4 moves an unloading device 3 to a position close to goods 5 on self-navigation carts 11 located at the unloading outlet 13, and the self-navigation carts 11 start to unload the goods 5;

S2, the unloading device 3 descends slowly when the goods 5 touch the unloading device 3, until the goods 5 completely slide onto the unloading device 3; and S3, the conveying device 4 is restored to a normal velocity, and conveys the unloading device 3 to a position close to a predetermined container 21 to unload.

Herein, the "slowly" in step S2 may be interpreted, for example, as a speed falling which is below the usual speed or the so-called "normal velocity". The usual speed or "normal velocity" may be a predetermined operating speed, or may also be a constant speed inherent for the unloading device according to factors such as its construction and so forth, which is certainly only illustrative, but not a limitation.

Similarly, the "normal velocity" in step S3 may be interpreted as above.

INDUSTRIAL APPLICABILITY

In conclusion, the present disclosure provides a three-dimensional unloading system capable of unloading goods into containers and a control method thereof, which are capable of directly unloading goods into a predetermined container on a shelf after sorting, so that the containers on the shelves are closely arranged, which, compared with the prior art, greatly increases the delivery density, improves the utilization of space, and also improves the unloading speed. When the self-navigation carts unload goods, the unloading device carries the goods slowly, which can effectively reduce the impact force on the goods, and reduce the damage to goods by collision. The present disclosure has the beneficial effects of a compact structure, a high space utilization rate, a fast unloading speed, and a reduced damage to the goods.

The invention claimed is:

1. A three-dimensional unloading system for unloading goods into a container, comprising:

a sorting platform, wherein the sorting platform is provided with a loading inlet and an unloading outlet;

a plurality of self-navigation carts, wherein the plurality of self-navigation carts travel on the sorting platform and unload, at the unloading outlet, the goods carried by the plurality of self-navigation carts;

a parcel identification device, wherein the parcel identification device is installed at the loading inlet of the sorting platform, and identifies the goods placed on the plurality of self-navigation carts; and a positioning device, wherein the positioning device is configured to perform positioning when the plurality of self-navigation carts are traveling, wherein the three-dimensional unloading system of for unloading the goods into the container further comprises:

more than one shelf, wherein each of the shelves is composed of a plurality of containers, each of the plurality of containers stores the goods, and the shelves are installed at the unloading outlet;

a conveying device, wherein the conveying device is fixed with a conveying frame;

an unloading device, wherein the unloading device is fixed on the conveying frame, the unloading device moves to the unloading outlet under a driving of the conveying device to carry the goods unloaded from the plurality of self-navigation carts, then moves to a predetermined container, and unloads the goods into the predetermined container; and a server, wherein the server is connected to controllers of the plurality of self-navigation carts in a wireless manner, and the server is connected to the parcel identification device, a controller of the conveying device, and a controller of the unloading device, in a wire or wireless manner.

2. The three-dimensional unloading system for unloading the goods into the container according to claim 1, wherein the unloading device comprises:

a first decelerator;

a rotation motor, wherein a housing of the rotation motor is fixed to a housing of the first decelerator, a rotating shaft of the rotation motor is fixed to an input shaft of the first decelerator, and the rotation motor is electrically connected to the controller of the unloading device;

a rotation bracket, wherein the rotation bracket is fixed to an output shaft of the first decelerator;

a rotation plate, wherein the rotation plate is fixed to the rotation bracket, and the rotation plate is configured to hold the goods;

a second decelerator, wherein a housing of the second decelerator is fixed to the conveying frame;

a swing motor, wherein a housing of the swing motor is fixed to the housing of the second decelerator, a rotating shaft of the swing motor is fixed to an input shaft of the second decelerator, and the swing motor is electrically connected to the controller of the unloading device; and a swing lever, wherein an end of the swing lever is fixed to an output shaft of the second decelerator, and another end of the swing lever is fixed to the housing of the first decelerator, wherein a rotation of the swing motor drives the rotation plate and swings the rotation plate to a position above the predetermined container, and a rotation of the rotation motor unloads the goods into the container.

3. The three-dimensional unloading system for unloading the goods into the container according to claim 2, wherein when the plurality of self-navigation carts unload the goods, the unloading device moves to the goods, and wherein when the goods contact the unloading device, the unloading device moves slowly downward, until the goods completely slide onto the unloading device.

4. The three-dimensional unloading system for unloading the goods into the container according to claim 1, wherein when the plurality of self-navigation carts unload the goods, the unloading device moves to the goods, and wherein when the goods contact the unloading device, the unloading device moves slowly downward, until the goods completely slide onto the unloading device.

5. The three-dimensional unloading system for unloading the goods into the container according to claim 4, wherein the sorting platform is provided as being of a plurality of layers, each layer of the sorting platform is provided with the plurality of self-navigation carts to transport and unload the goods, and each layer of the sorting platform is provided with the parcel identification device and the positioning device.

6. The three-dimensional unloading system for unloading the goods into the container according to claim 1, wherein the shelves are movable shelves, and the plurality of containers on the shelves are detachable.

7. The three-dimensional unloading system for unloading the goods into the container according to claim 6, wherein each layer of the shelves is provided with two parallel crosspieces, each of the plurality of containers is provided with two corresponding flanges, and the two corresponding flanges of the plurality of containers are pressed on the two parallel crosspieces.

8. The three-dimensional unloading system for unloading the goods into the container according to claim 1, wherein the unloading device comprises:

a first unloading driving wheel and a second unloading driving wheel, wherein shaft cores of the first unloading driving wheel and the second unloading driving wheel are rotatably connected to the conveying frame, respectively;

a conveying belt, wherein the conveying belt is connected to the first unloading driving wheel and second unloading driving wheel, and the conveying belt is configured to carry the goods; and an unloading motor, wherein a housing of the unloading motor is fixed to the conveying frame, a rotating shaft of the unloading motor is fixed to the shaft core of the first unloading driving wheel or the shaft core of the second unloading driving wheel, the unloading motor is electrically connected to the controller of the unloading device, and the unloading motor, when rotating, unloads the goods.

9. The three-dimensional unloading system for unloading the goods into the container according to claim 8, wherein when the plurality of self-navigation carts unload the goods, the unloading device moves to the goods, and wherein when the goods contact the unloading device, the unloading device moves slowly downward, until the goods completely slide onto the unloading device.

10. The three-dimensional unloading system for unloading the goods into the container according to claim 8, wherein the unloading motor is a gear motor.

11. The three-dimensional unloading system for unloading the goods into the container according to claim 10, wherein when the plurality of self-navigation carts unload the goods, the unloading device moves to the goods, and wherein when the goods contact the unloading device, the unloading device moves slowly downward, until the goods completely slide onto the unloading device.

12. The three-dimensional unloading system for unloading the goods into the container according to claim 8, wherein the unloading device comprises a plurality of carrier wheels, and the carrier wheels are configured to support a middle part of the conveying belt to increase a maximum carrying weight for the goods.

13. The three-dimensional unloading system for unloading the goods into the container according to claim 12, wherein when the plurality of self-navigation carts unload the goods, the unloading device moves to a position close to the goods, and wherein when the goods contact the unloading device, the unloading device moves slowly downward, until the goods completely slide onto the unloading device.

14. The three-dimensional unloading system for unloading the goods into the container according to claim 1, wherein the conveying device comprises a vertical moving device, and the vertical moving device is provided with:

a first hollow lever, wherein the first hollow lever is vertically fixed relative to the ground, the first hollow lever is provided with an open end, and two outer sides of the first hollow lever are provided with grooves;

a first synchronous belt wheel and a second synchronous belt wheel, wherein the first synchronous belt wheel and the second synchronous belt wheel are rotatably fixed inside the first hollow lever at two ends, respectively;

a synchronous belt, wherein the synchronous belt is connected to the first synchronous belt wheel and the second synchronous belt wheel;

an actuating motor, wherein a housing of the actuating motor is fixed to the first hollow lever, a rotating shaft of the actuating motor is fixed to a shaft core of the first synchronous belt wheel or a shaft core of the second synchronous belt wheel, and the actuating motor is electrically connected to the controller of the conveying device; and a sliding block, wherein the sliding block is provided with a convex block and two sliding rails, the convex block is embedded into the open end of the first hollow lever and fixed to the synchronous belt, the sliding rails only move back and forth along the grooves, and the sliding block is fixed to the conveying frame.

15. The three-dimensional unloading system for unloading the goods into the container according to claim 14, wherein when the plurality of self-navigation carts unload the goods, the unloading device moves to the goods, and wherein when the goods contact the unloading device, the unloading device moves slowly downward, until the goods completely slide onto the unloading device.

16. The three-dimensional unloading system for unloading the goods into the container according to claim 14, wherein the actuating motor is provided with a decelerating mechanism.

17. The three-dimensional unloading system for unloading the goods into the container according to claim 16, wherein when the plurality of self-navigation carts unload the goods, the unloading device moves to the goods, and wherein when the goods contact the unloading device, the unloading device moves slowly downward, until the goods completely slide onto the unloading device.

18. The three-dimensional unloading system for unloading the goods into the container according to claim 14, wherein the conveying device further comprises:

a lateral moving device, wherein a structure of the lateral moving device is the same as that of the vertical moving device, and a second hollow lever of the lateral moving device is fixed horizontally to the ground through a bracket, the first hollow lever in the vertical moving device is fixed to a sliding block in the lateral moving device, and an actuating motor in the lateral moving device is electrically connected to the controller of the conveying device.

19. The three-dimensional unloading system for unloading the goods into the container according to claim 18, wherein two lateral moving devices are provided, one vertical moving device is provided, an upper part and a lower part of the vertical moving device are fixed to the sliding blocks of the two lateral moving devices respectively.

20. A control method for a three-dimensional unloading system for unloading goods into a container, the control method being executed in a three-dimensional unloading system that includes a sorting platform having a loading inlet and an unloading outlet, a plurality of self-navigation carts disposed to travel on the sorting platform, a parcel identification device installed at the loading inlet of the sorting platform, a positioning device configured to perform positioning of the plurality of self-navigation carts, more than one shelf installed at the unloading outlet and composed of a plurality of containers, including a predetermined container, a conveying device fixed with a conveying frame, an unloading device fixed on the conveying frame, and a server communicatively connected to controllers of the plurality of self-navigation carts, the parcel identification device, the conveying device, and the unloading device, wherein the control method comprises steps of:

S1, moving, by the conveying device, the unloading device to the goods on the plurality of self-navigation carts located at the unloading outlet, and starting to unload the goods by the plurality of self-navigation carts;

S2, the unloading device descending slowly, when the goods contact the unloading device, until the goods slide onto the unloading device; and S3, the conveying device returning to a normal velocity, and conveying the unloading device to the predetermined container to unload.

* * * * *